United States Patent [19]

Ramaswamy et al.

[11] 4,142,775
[45] Mar. 6, 1979

[54] OPTICAL SIGNAL PROCESSING DEVICES

[75] Inventors: Vellayan Ramaswamy, Lincroft; Robert D. Standley, Shrewsbury, both of N.J.

[73] Assignee: Bell Telephone Laboratories, Incorporated, Murray Hill, N.J.

[21] Appl. No.: 727,047

[22] Filed: Sep. 27, 1976

[51] Int. Cl.² .............................................. G02B 5/14
[52] U.S. Cl. .................................................. 350/96.14
[58] Field of Search ............. 350/96 C, 96 WG, 96.14

[56] References Cited

U.S. PATENT DOCUMENTS

| | | | |
|---|---|---|---|
| 3,909,108 | 9/1975 | Taylor | 350/96.14 |
| 4,012,113 | 3/1977 | Kogelnick et al. | 350/96 C |

OTHER PUBLICATIONS

*Digest of Tech. Papers of the Topical Meeting on Integrated Optics*, New Orleans (1974) WA-5 by Zernike.
*Bell System Tech. Jour.*, No. 48 (1969) pp. 2071-2102, by Marcatili.
*Journal of the Optical Society of America*, No. 62 (1972) pp. 1346-1347 by Zernike et al.
*Applied Physics Letters*, vol. 27, No. 5 (1975) p. 289 by Papuchon et al.
*Applied Physics Letters*, vol. 27, No. 15 (1975) p. 555 by Kaminow et al.
*18th Annual Electronic Materials Conference, the Metallurgical Society of AIME* (Salt Lake City, 1976) 22 by J. C. Shelton.

Primary Examiner—John K. Corbin
Assistant Examiner—Stewart Levy
Attorney, Agent, or Firm—Allen N. Friedman

[57] ABSTRACT

Optical signal processing devices, primarily intended for use in integrated optical communication systems, include 3 dB coupled strip guide directional couplers. Each coupler is formed in a body of electrooptic material and includes electrodes bracketing at least one of the guides in the coupled region. Each coupler is fabricated so as to be overcoupled (i.e., greater than 3 dB coupling) when the coupling is synchronous. Voltage bias, supplied to the electrodes of each coupler, produces sufficient asynchronism to independently adjust each coupler to the desired 3 dB coupling condition. Permutation switches are produced by including a switchable phase shifter between two couplers. Channel drop filters are produced by including reflection gratings between two couplers. Differential phase detectors, for a pulse code modulation system, are produced by including a selected path length difference between the two strip guides connecting two couplers. A photolithographic technique for producing the required electrodes in precise registry with the strip guide couplers (typically characterized by 3 micrometer spacings) includes the use of the primary strip guide mask and a secondary mask to produce a photolithographic mask for defining the electrodes.

9 Claims, 24 Drawing Figures

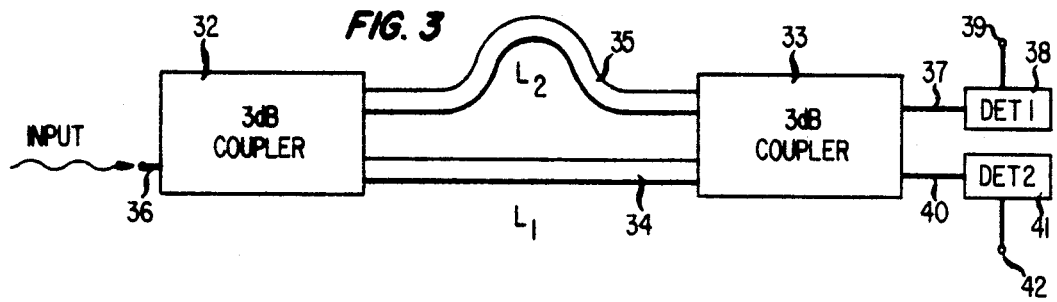

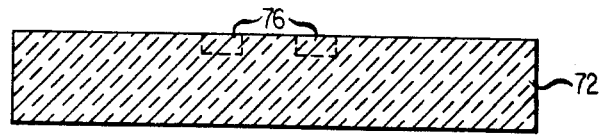
FIG. 13
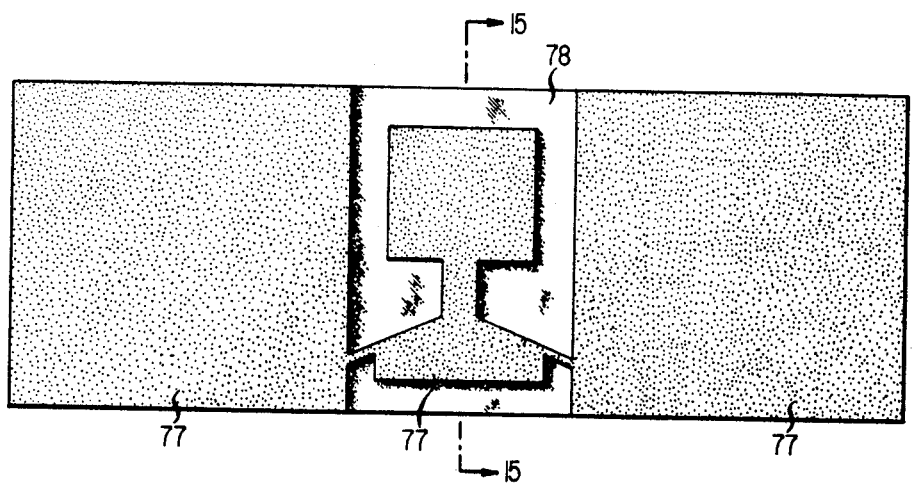
FIG. 14
FIG. 15
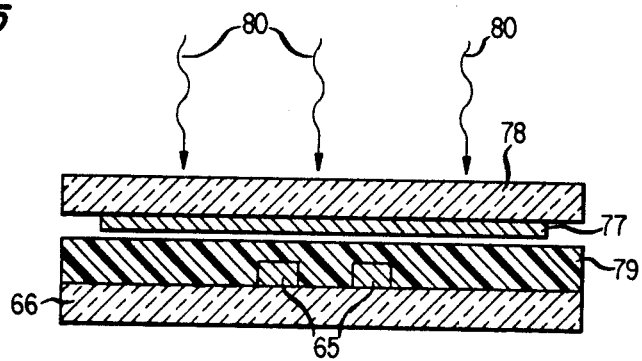
FIG. 16
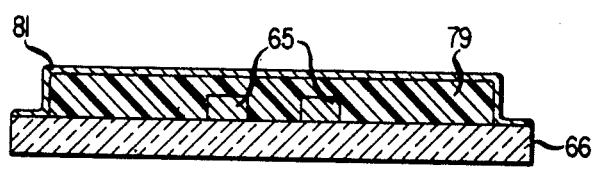
FIG. 17
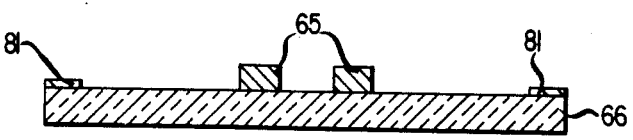

OPTICAL SIGNAL PROCESSING DEVICES

BACKGROUND OF THE INVENTION

1. Field of the Invention

The invention is in the field of integrated optic devices and photolithographic techniques for their fabrication.

2. Brief Description of the Prior Art

A great deal of effort has recently gone into the development of signal processing devices for optical communication systems. Much of this effort has gone into the development of optical devices which can be fabricated by photolithographic techniques on planar substrates with a view to the integration of large arrays of devices on large area substrates. The substrates are transparent to the optical signals being employed. The optical signals are transmitted along strip waveguides produced by the deposition of material on the substrate or the diffusion of material into the substrate in order to locally modify its optical properties.

One basic device in such an integrated optic system is the optical directional coupler. One such coupler is produced by the formation of two strip waveguides which are in close proximity with one another, over a defined length (Marcatili, *Bell System Technical Journal*, 48 (1969) 2071). In such a coupler some or all of the light introduced into one strip guide is transferred to the other guide. These directional couplers have been used to fabricate electrically actuated switches and modulators by, for example, the fabrication of the coupler and a set of electrodes on an electrooptic material. The coupled length is chosen to produce full power coupling from one strip to the other in the absence of a voltage bias across the electrodes. The electrodes are so situated that a voltage bias produces a difference in the optical propagation constant in one guide relative to that in the other guide. This difference of propagation constant (often referred to as asynchronism) results in the reduction of light coupling from one guide to the other. The magnitude of the applied bias is chosen so as to reduce the coupling to as nearly zero as possible. In this way the application of the switching bias voltage switches the light output from the coupled guide to the originating guide (Zernicke et al., *Journal of the Optical Society of America*, 62 (1972) 1346, Papuchon et al., *Applied Physics Letters*, 27 (1975) 289). A modification of this type of switch is disclosed in copending application Ser. No. 641,649. In this switch the biasing electrodes are separated into two longitudinal portions which are oppositely biased. This produces a switch which is, among other things, less critical of manufacture.

Another type of integrated optical switch, taught in the art, incorporates two 3 dB couplers (i.e., one-half of the incident power emerges from each of the two output ports). The two 3 dB couplers are linked by two strip guides with a phase modulator being incorporated in one or both of these intermediate guides. The introduction, via an electrical bias voltage, of a $\pi$ relative phase shift, switches the light output from one port to another of the composite device (Kaminow et al., *Applied Physics Letters*, 27 (1975) 555; Zernicke, *Digest of Technical Papers of the Topical Meeting on Integrated Optics*, New Orleans (1974) WA5). The utility of such a switch for a communication system depends, in part, upon the ability to limit the crosstalk between communication channels to an acceptable level by switching all of the power from one port to another. In this type of switch, the ability to limit crosstalk depends, in part, upon the accuracy of the 3 dB split of each coupler. The line widths and spacings characteristic of such devices (e.g., 1-5 micrometers) make it difficult to consistently achieve accurate 3 dB splits merely by close control of manufacturing tolerances. Zernicke (referred to above) suggests adjusting the length of each coupler after its initial fabrication to produce the desired equality of power split. However, this could be burdensome for large-scale multi-element systems.

SUMMARY OF THE INVENTION

The class of optical signal processing devices has been invented, particularly adapted for use in integrated optic communications systems. These devices incorporate electrically adjustable 3 dB coupled strip guide directional couplers. These couplers incorporate an electrooptic material to permit electrical adjustment. A preferred class of switch devices incorporates the electrooptic material as the substrate, the devices being formed by photolithographic techniques on substrates such as lithium niobate and lithium tantalate. Strip waveguides can be formed on such materials by known techniques involving, for example, the diffusion of titanium or niobium, respectively, into the substrate in a photolithographically defined pattern in order to produce the increased index of refraction required for optical guidance. A directional coupler results when two strip guides are placed in close proximity over a preselected length such that some or all of the light introduced into one strip guide is transferred to the other guide.

Electrical adjustability is provided in such couplers by the incorporation of a set of electrodes bracketing at least one of the guides in the region of coupling. The coupled length is selected to produce more than half power coupling from one guide to the other in the absence of voltage bias. A voltage applied to the electrodes produces an electric field in at least one of the strip guides changing the propagation velocity in one guide relative to that in the other guide. The asynchronism, thus produced, results in reduced coupling in one guide to the other. Thus the originally over-coupled coupler can be adjusted to 3 dB by the selection of an appropriate bias voltage. Once selected, the bias voltage remains fixed and the coupler is maintained in the desired half power coupling state with minimal power consumption during use.

The electrically adjustable 3 dB coupler, described above, is the basic element of a number of signal processing devices. Permutation switches are produced by including a switchable phase shifter between two couplers. Channel drop filters are produced by including reflection gratings between two couplers. Differential phase detectors for a pulse code modulation system are produced by including a selected half length difference between the two strip guides connecting two couplers. The electrical adjustability of these couplers greatly eases the otherwise stringent fabrication tolerances necessitated by the fine lines and small spacings characteristic of these devices (e.g., 3 micrometer wide guides separated by 2 to 3 micrometers in the coupled region).

The small characteristic widths and spacings of the above couplers also exacerbate the problem of registering the required electrode pattern with the guide pattern. This is particularly difficult in the placement of electrodes between the guides in the coupled region of the directional couplers.

In general, separate electrode and strip guide pattern masks have to be made with the same exact registration to enable proper alignment using standard photolithography. With analog electron beam writing registration of masks could be a problem. A photolithographic technique has been developed which permits this registry even in the face of curvature or other irregularity in the guides. In this photolithographic technique a primary mask is used to define the guide pattern. This same primary mask is subsequently used, in conjunction with a secondary mask, to define the electrode pattern. The primary and secondary masks are superposed to generate the final electrode mask, the primary mask defining the critical inner boundaries of the electrodes and the secondary mask defining the less critical outer boundaries of the electrodes.

BRIEF DESCRIPTION OF THE DRAWINGS

FIG. 3 is a partially schematic plan view of an exemplary differential phase detector;

FIG. 4 is a schematic view of an exemplary pulse code modulation communication system employing a device of FIG. 3;

FIG. 5 is a schematic view of an exemplary multichannel pulse code modulation communication system;

FIGS. 6 through 22 are variously plan views and elevational views in section illustrating the sequential photolithographic steps for the production of an exemplary device of FIG. 1;

DETAILED DESCRIPTION

Integrated Optics

Figure 1:
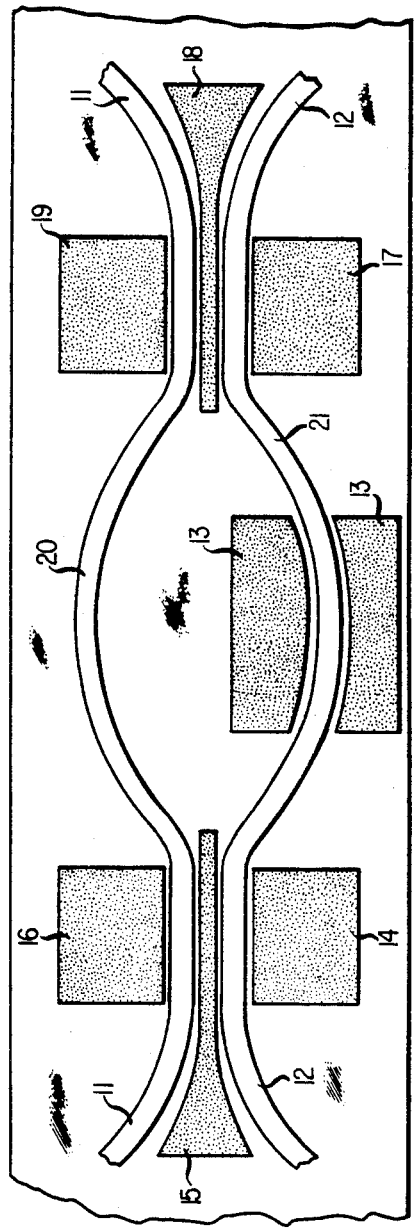
FIG. 1 is a plan view of an exemplary optical permutation switch employing two electrically adjustable 3 dB couplers and an intermediate switchable phase shifter.
Figure 2:
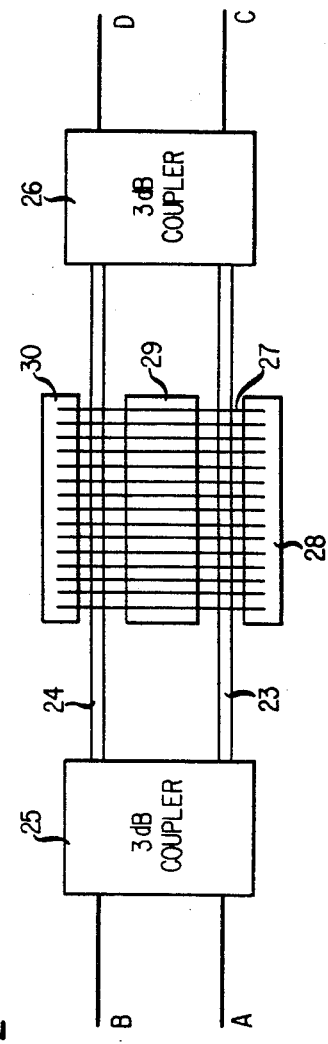
FIG. 2 is a partially schematic plan view of an exemplary frequency tunable channel dropping filter.

The basic requirement for the realization of an integrated optical signal processing system is the provision of preselected paths along which the optical signals are to be guided in the substrate. These paths can be produced by photolithographic techniques which ultimately result in the definition of higher index of refraction regions in selected portions of the substrate. These higher index of refraction regions are necessary for light guidance. These can be produced by, for example, the deposition of a higher index of refraction glass, on a lower index of refraction substrate, or by the diffusion of an impurity into the substrate which results in an increase of index of refraction in the diffused regions. FIG. 1 is an exemplary device employing such a pattern of strip waveguides. The defined waveguide strip regions 11, 12 are produced in a pattern designed to accomplish the various desired functions. A phase modulator is produced when a strip waveguide is formed in an electrooptic material. When an electrical field is applied to the electrooptic material in the strip guide region the optical propagation velocity changes producing a modulation of the phase of the guided light. In order to produce such an electric field, electrodes are placed adjacent to a length of strip guide, such as is indicated in FIG. 1 by elements 13. This phase change is selectable by the selection of the magnitude of voltage bias applied to the electrodes 13. Such phase modulators have been formed in lithium niobate, lithium tantalate and semiconductor materials. In the niobate and tantalate materials strip guidance is produced by diffusion of titanium or niobium, respectively, into the substrate material.

A phenomenon which is extensively used in the production of integrated optic devices is the phenomenon of light coupling between guides. When two guides are formed in close proximity to one another and light is launched into one of the guides a portion at that light is transferred to the other guide in the region of their proximity and emerges from the second guide. The amount of light which is coupled from one guide to the other depends upon their proximity and the length over which they are coupled. The coupling can be characterized by a coupling constant, k, or alternatively by a characteristic coupling length, l. When the total coupled length is an odd multiple of the characteristic coupling length the light entering one guide is entirely coupled to the other and emerges from this second guide. If the coupled length is an even multiple of the characteristic length no light emerges from the second guide. The coupling constant (or the characteristic coupling length) depends sensitively on the width of the two strip guides, their spacing and the uniformity of the higher index region. A pair of such coupled strip guides forms a directional coupler. Since the coupling is also sensitive to the optical mode pattern of the conducted light, it is preferred that care be taken to insure that the strip guides are single mode structures. If this is not the case the degree of coupling will be somewhat sensitive to the source launching conditions and coupling between modes due to imperfections in the guides.

An optical reflection grating can be formed in a strip guide by the formation of a regular array of higher or lower index perturbations along the length of the guide. Such a structure produces the reflection of one or a set of wavelengths, dependent upon the space of the perturbations, and the transmission of all others. If the grating is formed in a phase modulator strip the reflected frequency or frequencies can be changed by variation of the applied voltage bias.

Electrically Adjustable 3 dB Coupler

Optic coupling between two adjacent strip guides is most effective when their propagation velocities are identical. This condition is often referred to as synchronism between the guides. The degree of coupling of two guides can, thus, be reduced if the guides can in some way be made asynchronous. This characteristic of optical coupling is used in order to produce the electrically adjustable couplers of the invention. The couplers are fabricated so as to produce more than half power (3 dB) coupling in the synchronous state and are formed in an electrooptic material. Asynchronism between the guides is introduced by the application of an electric field in the electrooptic material in at least one of the guides, over at least a portion of the coupled region. The asynchronism thus produced, reduces the coupling between the guides. The applied field is selected so as to produce precise 3 dB coupling. The required electric field can be produced by the incorporation of electrodes on the surface of the electrooptic material such as illustrated in FIG. 1. In that figure, electrodes 14, 15, and 16 bracket at least one of the strip guides 11, 12 or both of the guides. A voltage applied between, for example, electrodes 14 and 15 produces a deviation (increase of decrease) of the propagation velocity, in the region of guide 12 between the electrodes 14, 15. Depending upon the crystalline orientation of the electrooptic material the asynchronism can be accentuated by the production of an opposite deviation of propagation velocity in guide 11 by application of an appropriate voltage bias between electrodes 15 and 16.

Since the coupling between lightguides is, critically dependent on the accuracy of their fabrication, the ability to electrically adjust the degree of coupling by this method is highly desirable. This is particularly true because the required bias voltage is stable with time. Thus, once the required bias voltage is measured during final stages of manufacture, it is expected to remain the same during device use. This ability greatly relaxes the required manufacture tolerances for integrated optic systems incorporating such couplers. In order to realize an electrically adjustable 3 dB coupler the coupled length of the strip guides must be sufficient to produce more than half power coupling. In theory any length beyond that produces an operative device. However, in order to minimize the overall length of the device the coupler length should, preferably, be limited to be less than the characteristic coupling length, l.

Signal Processing Devices

The devices presented below are exemplary of the signal processing devices which are realized through employment of the electrically adjustable 3 dB couplers of the invention.

1. Permutation Switch

FIG. 1 shows an optical permutation switch employing electrically adjustable 3 dB couplers. In this switch, strip guides 11 and 12 are coupled in the region of electrodes 14 and 16 and 17 and 19. The two couplers, thus formed, are connected by (un) coupled lengths of strip guide 20 and 21. Electrodes 15 and 18 are situated between the strip guides 11, 12 in the coupled region and electrodes 13 bracket one of the connecting guides 21. The device is formed in an electrooptic material so that voltages applied to electrodes 14, 15 and 16 (similarly between electrodes 17, 18, and 19) produce the desired decrease of optical coupling between guides 11 and 12 by producing asynchronism between the guides. In order to produce the desired asynchronism only one pair of electrodes 14, 15 (or 15, 16) bracketing one of the guides 12 (or 11) is necessary. However, suitable choice of the crystalline orientation of the electrooptic material permits a reduction of the required bias voltages through the use of three electrodes 14, 15, 16 as shown. This is true because the field applied to one strip guide 11 can be chosen to change the propagation velocity in that guide oppositely to the change produced in the other guide 12 by the electric field produced by the corresponding pair of electrodes 14, 15. For example, if the substrate material is lithium niobate whose optic axis is contained in the plane parallel in the surface and is perpendicular to the direction of light propagation in the coupled region, similarly poled voltages, applied to the outer electrodes 14, 16 relative to the voltage applied to the center electrode 15 will produce this result. Electrodes 13 bracket one of the connecting guides 21 to form the phase modulator section which produces the optical switching. Light is switched from one output port to the other by the application of a voltage bias to electrodes 13 sufficient to produce a $\pi$ phase shift.

2. Channel Drop Filter

A channel drop filter is formed by the inclusion of an optical grating in the two strip guides 23, 24 separating two electrically adjustable 3 dB couplers 25, 26. If light is coupled into port A the portion of that light which corresponds in frequency to the spacing of the lines of the optical grating 27 will be reflected and emerged from port B while the remainder emerges from port C. This reflected radiation can correspond to one channel of a communication system. The frequency of that channel may be varied by variation of the propagation velocity through the strip guides 23, 24, in the region of the grating 27. If the grating is formed in an electrooptic material the propagation velocity can be varied through application of suitable bias voltages through a set of electrodes 28, 29, 30. Coupler 25 and gratings 27 form a useful filter, for example, if the transmitted light is of no interest.

3. Differential Phase Detector

FIG. 3 shows, in schematic form a differential phase detector for use in a pulse code modulation communication system. In operation this detector differentiates between sequential pulses which are in the same phase and those which are oppositely phased. In this device two electrically adjustable 3 dB couplers 32, 33 are connected by strip guides 34, 35. Strip guide 35 is longer than strip guide 34 by a length selected such that light traveling through guide 35 arrives at the coupler 33 at the same time as light traveling through guide 34 from the next sequential light pulse introduced into the input 36. If the input light pulse train has been modulated such that a phase shift of $\pi$ (180 degrees) has been introduced between sequential light pulses, light will emerge from the upper port 37 of coupler 33 and be incident on detector 38 producing an output signal at the output connection 39. If the sequential light pulses are of the same phase, light will emerge from port 40, be incident on detector 41 and will produce an output signal at connection 42. In order for sequential pulses to interfere, the coherence time of the transmitted light must be longer than the bit spacing. Light from a YAG LASER should posses sufficient coherence for operation of this device at a gigabit rate.

This operation is shown in somewhat more detail in FIG. 4, which shows an exemplary pulse code modulation system. A laser source 43 produces a uniformly spaced train of optical pulses 44. The pulses pass through a phase modulator 45 which introduces a $\pi$ phase shift in selected light pulses in accordance with electrical signals introduced into the formation input connection 46. The modulated pulse train 47 is transmitted over the optical transmission line 48 ultimately being incident on a differential phase detector 49, such as illustrated in FIG. 3. Electrical signals appear at the output ports 50 or 51 in accordance with the electrical signal introduced into the information input port 46. FIG. 5 shows a more extended multi-channel communication system in which sources S1 through SN are modulated by phase modulaters PM1 and PMN ultimately producing signals in an array of output connections 52.

Photolithographic Technique

The electrically adjustable 3 dB couplers presented above incorporate optical strip guides, typically, a few micrometers (e.g., 2 to 3 micrometers) in width separated by space of the order of a few micrometers. The formation of such devices is critically dependent upon the ability to photolithographically form electrode patterns in precise registry with small scale strip guide patterns. The most difficult element to define is the electrode which must be applied to the space in between the two strip guides. A photolithographic technique has been developed which makes use of the primary strip-guide-defining pattern and a secondary less critical pattern in order to produce a photolithographic mask to define the electrode pattern. FIGS. 6 through 22 illustrate an exemplary sequence of processing steps within the generally defined technique. The general technique involves first generating the primary mask by a highly defined photolithographic technique such as electron beam lithography, then using this mask to produce the required strip guides on the substrate. This may be done, for example, by photolithographically defining a pattern of titanium on a lithium niobate substrate, then heating the substrate to produce diffusion of the titanium into the lithium niobate. Other techniques known to the art include the deposition of a pattern of high index glass on a lower index substrate. A secondary mask is also generated which will ultimately define the outer extent of the electrodes.

The primary mask is then used to serve as or to produce a tertiary mask intermediate which ultimately will define the inner dimensions of the electrodes. The secondary mask is then superimposed upon the tertiary mask intermediate to complete the definition of the electrodes thus producing the tertiary mask. This mask is then registered with the strip guides on the substrate in order to photolithographically produce the electrodes.

FIG. 6 shows an exemplary pattern of strip guides 61, 62 which are close enough in the regions generally defined by the arrows 63 and 64 to be optically coupled and be a directional coupler. The guides 61, 62 are shown as curved to illustrate the versatility of the developed photolithographical processes in producing precisely registered electrode patterns even when the strip guides are curved.

Figure 7:
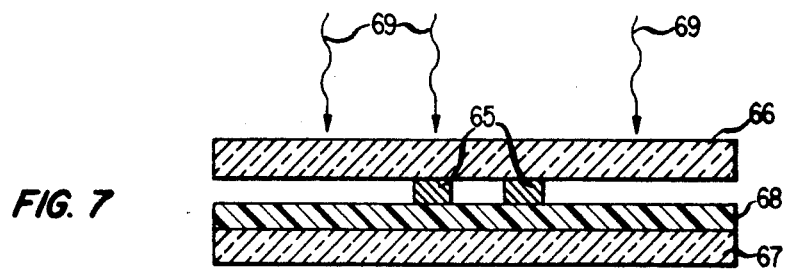

The primary pattern, shown in section in FIG. 7 is a pattern of metal strips 65 (e.g., chromium) on a transparent substrate 66 (e.g., a stable glass). In an exemplary embodiment this pattern was produced by an electron beam lithographic process involving writing the pattern with an electron beam on a polymethyl methacrylate positive photoresist layer, dissolving the written portions, depositing chromium on the entire device, and dissolving the remaining polymethyl methacrylate with attendant removal of the extraneous chromium.

Figure 8:
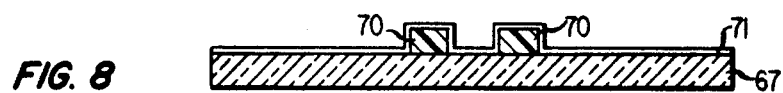
Figure 9:
Figure 10:
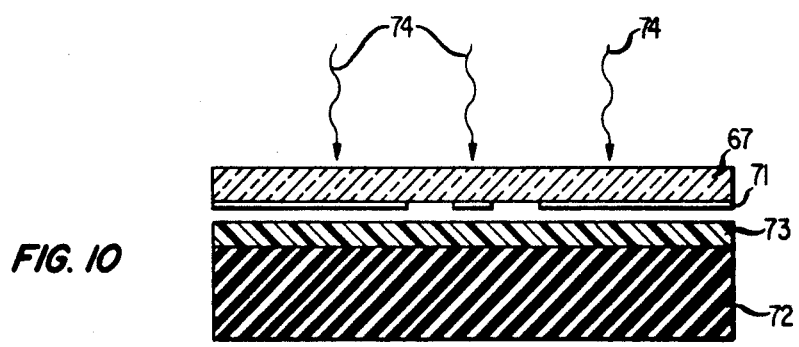
Figure 11:
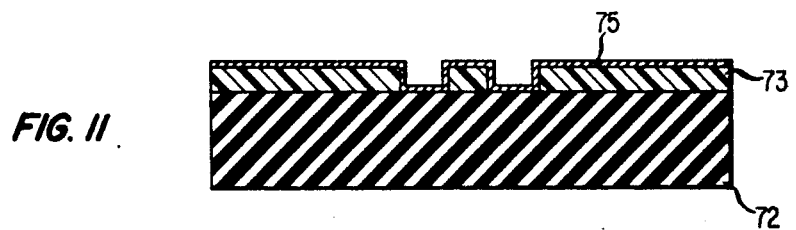
Figure 12:
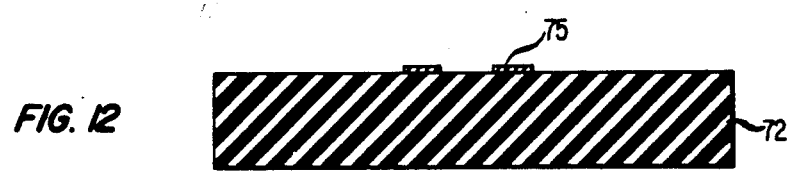
Figure 18:
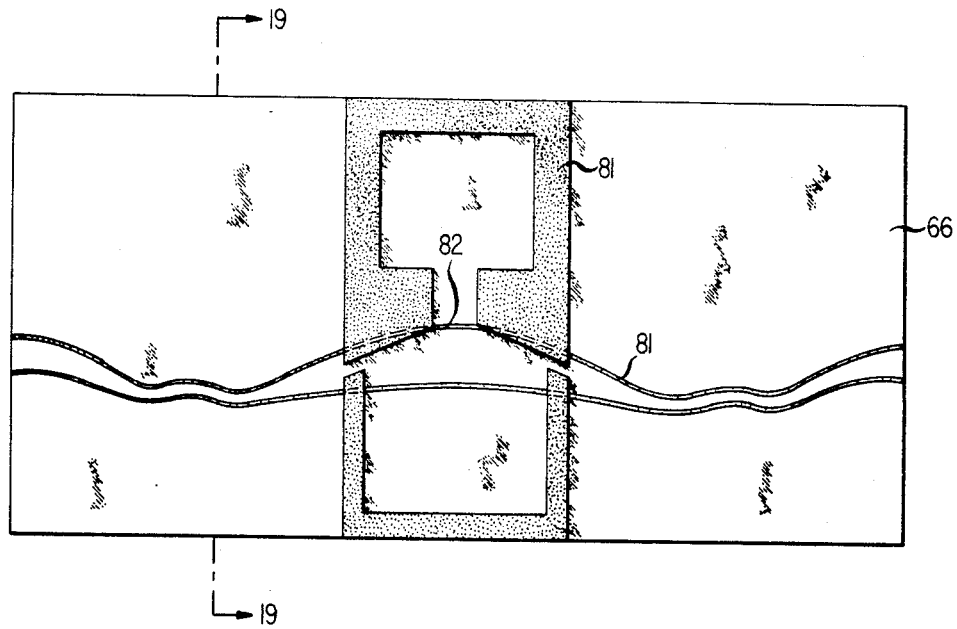
Figure 19:
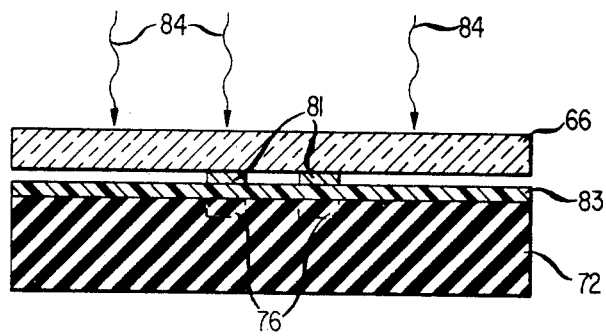
Figure 20:
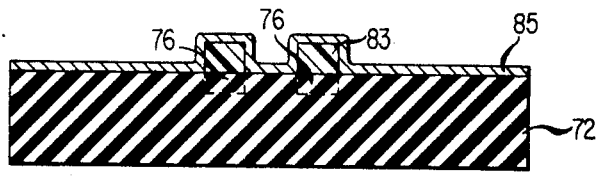
Figure 21:
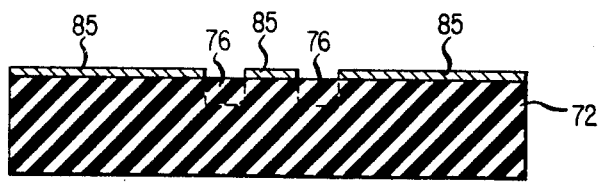

The remaining photolithographic steps employed ultraviolet radiation and a positive photoresist (e.g., a depolymerizing resist in which the exposed portion is rendered more soluble). In FIG. 7 the primary pattern 65, 66 is superimposed on a glass plate 67 with a layer 68 of a positive photoresist. The photoresist is exposed by ultraviolet radiation 69 and the exposed portion of the photoresist layer 68 washed away. As illustrated in FIG. 8, this leaves a pattern of photoresist material 70 on the substrate 67. The entire surface is then coated with a layer 71 of chromium. The remaining photoresist 70 is then dissolved with attendant removal at the superposed portion of the layer 71 resulting in the mask illustrated in FIG. 9 which is the negative of the mask of FIG. 6. FIG. 10 shows this mask 67, 71 superimposed upon a lithium niobate substrate 72 with a layer of positive photoresist 73. The photoresist 73 is exposed by radiation 74 through the mask 67, 71 and the exposed portions dissolved. As shown in FIG. 11, the entire surface is then coated with a layer 75 of titanium. The remaining photoresist 73 is then dissolved, with removal of the superimposed titanium, leaving a pattern (see FIG. 12) of titanium 75 on the substrate 72. The composite 72, 75 is then subject to a heat treatment which produces diffusion of the titanium pattern into the substrate (see FIG. 13) producing a pattern of relatively high index of refraction transparent material 76 in the substrate 72. This pattern of higher index material in a lower index of refraction transparent body results in light guidance which is the fundamental requirement for the optical signal processing of the invention.

Figure 22:
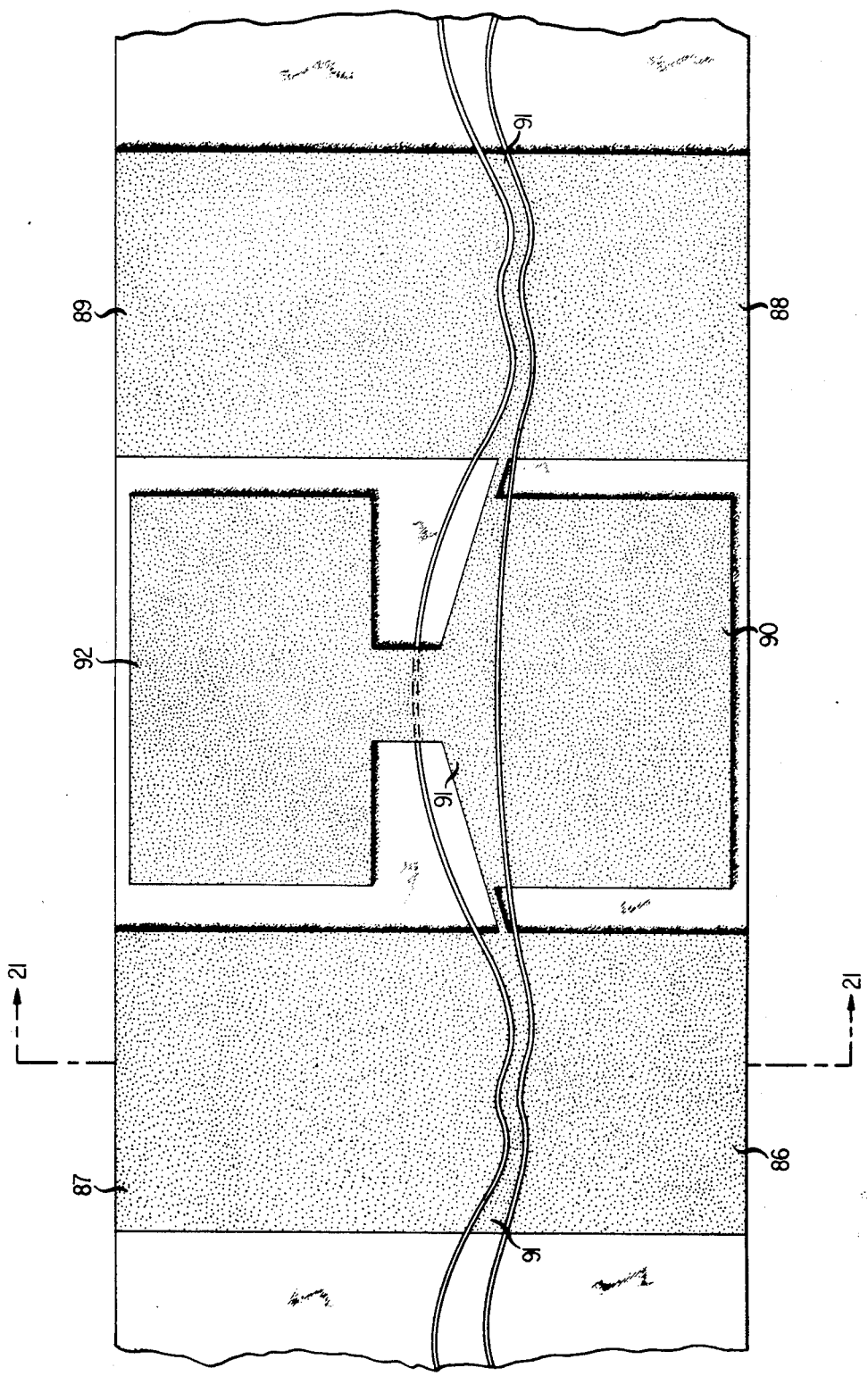

FIG. 14 shows the secondary mask which is used to define the less critical outer dimensions of the electrodes. This pattern is formed in a chromium layer 77 on a transparent glass substrate 78. It may be produced by relatively less well defined photolithographic techniques such as those involving the photographic reduction of a larger mechanically defined pattern. In order to produce the final electrode mask the primary mask 65, 66 of FIG. 7 is coated (see FIG. 15) with a layer 79 of positive photoresist. The secondary mask 77, 78 is superimposed upon the resulting composite 65f, 66, 79 and exposed 80 through the mask 77, 78. The exposed portion of the layer 79 is dissolved and the entire surface coated with a chromium layer 81 (see FIG. 16). The remaining photoresist 79 is then dissolved with attendant removal of the superposed portion of the chromium layer 81. This results in the final electrode mask illustrated in FIGS. 17 and 18. A secondary photolithographic process was used to remove the small metal strip 82. The device substrate 72 with its diffused guides 76 (see FIG. 13) is coated (see FIG. 19) with a layer 83 of positive photoresist and the final electrode mask 66, 81 is superposed thereon in registry with the diffused guides 76. The photoresist layer is exposed 84 and the exposed portions dissolved. The entire surface is coated with a metal layer 85 (see FIG. 20). The remaining photoresist 83 is then dissolved with attendant removal of superposed metal layer 85. These remaining portions of the metal layer 85 form the desired electrodes as illustrated in FIG. 22. Metal areas 86, 87, 88 and 89 correspond to electrodes 14, 16, 17 and 19 of FIG. 1. Metal area 90 corresponds to the lower electrode 13 of FIG. 1 and the metal area 91 corresponds to the upper electrode 13 and electrodes 15 and 18 of FIG. 1. These electrodes are connected and have a common bonding pad 92 for connection to external circuitry.

Figure 23:
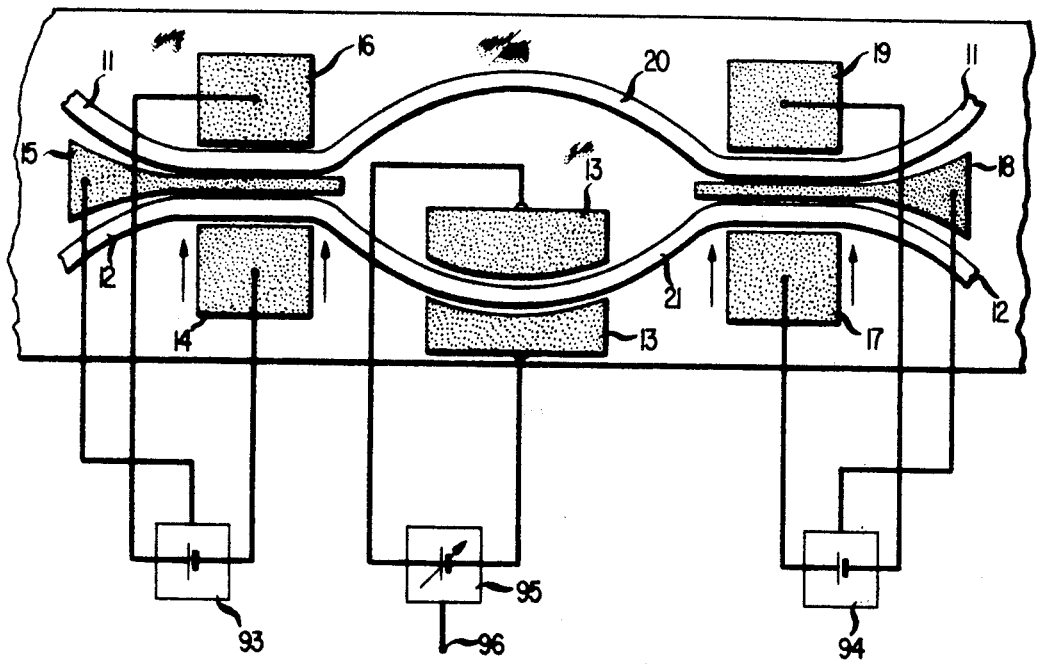
FIG. 23 is a partially schematic plan view of an exemplary permutation switch.

FIG. 23 shows an exemplary switch of the invention including the fixed voltage supplies 93, 94, which are selected to provide half power coupling and the switchable power supply 95, which switches in response to signal terminal 96.

Figure 24:
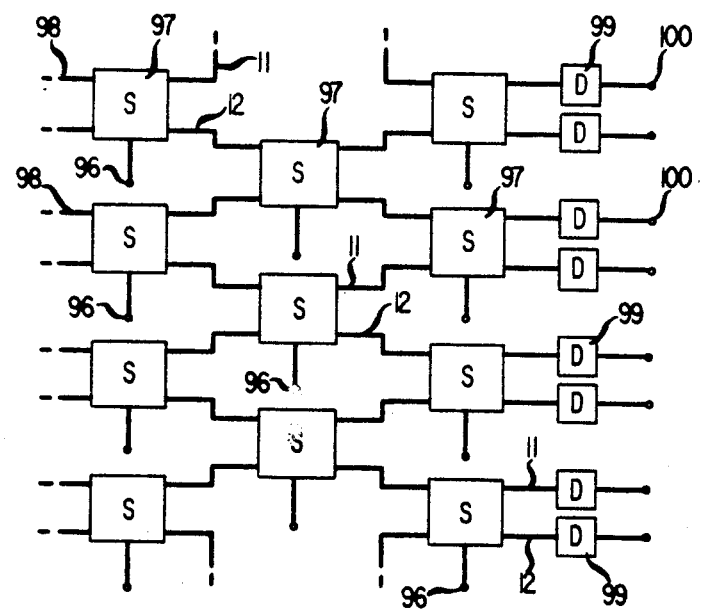
FIG. 24 is a schematic view of a switch array.

FIG. 24 shows an interconnected array of permutation switches 97, which selectively switches light from input ports 98 to an array of detectors 99, producing electrical outputs at output terminals 100.

What is claimed is:

1. An optical signal processing system including an interconnected array of optical signal processing devices including at least a first optical signal processing device and a second optical signal processing device, which devices each comprise a first directional coupler and a second directional coupler, but not more than two directional couplers; input means for introducing light into the first directional coupler, introduction of said light resulting in coupled light; processing means for performing signal processing operations on the coupled light, which said processing means includes a first optically conductive path and a second optically conductive path linking the first directional coupler with the second directional coupler, the processing of said coupled light resulting in processed light; and output means for utilizing the processed light: which said first directional couplers and said second directional couplers each consists essentially of (1) a first optical strip guide and a second optical strip guide, formed in a body of electrooptic material so as to be synchronously coupled over a coupled length sufficient to provide more than half power coupling but less than full power coupling from one guide to the other, (2) a set of electrodes on the body, for producing an electric field at the strip guides over at least a portion of the coupled length, the set of electrodes consisting of a central electrode, situated between the strip guides and at least one outer electrode, and (3) means for impressing a control voltage on the electrodes of magnitude to produce sufficient asynchronism between the guides to reduce the coupling to half power whereby the directional coupler is caused to become a 3 dB coupler; in which said signal processing system the optical signal processing devices are interconnected such that the output means of the first optical signal processing device includes at least a portion of the input means of the second optical signal processing device.

2. An optical signal processing device comprising two, but not more than two, directional couplers; input means for introducing light into the coupler, introduction of said light resulting in coupled light; processing means for performing signal processing operations on the coupled light, which said processing means includes a first optically conductive path and a second optically conductive path linking the two directional couplers, which first optically conductive path includes a phase modulator, the processing of said coupled light resulting in processed light; and output means for utilizing the processed light: which said directional couplers each consists essentially of (1) a first optical strip guide and a second optical strip guide, formed in a body of electrooptic material so as to be synchronously coupled over a coupled length sufficient to provide more than half power coupling but less than full power coupling from one guide to the other, (2) a set of electrodes on the body, for producing an electric field at the strip guides over at least a portion of the coupled length, the set of electrodes consisting of a central electrode, situated between the strip guides and at least one outer electrode, and (3) means for impressing a control voltage on the electrodes of magnitude to produce sufficient asynchronism between the guides to reduce the coupling to half power whereby the directional coupler is caused to become a 3 dB coupler; which phase modulator is adapted for switchably introducing and removing a phase shift of $\pi$ relative to the second optically conductive path, whereby the device functions as a bipolar switch.

3. An optical signal processing device comprising two, but not more than two directional couplers; input means for introducing light into the coupler, introduction of said light resulting in coupled light; processing means for performing signal processing operations on the coupled light, which said processing means includes a first optically conductive path and a second optically conductive path linking the two directional couplers, the processing of said coupled light resulting in processed light; and output means for utilizing the processed light: which said directional coupler consists essentially of (1) a first optical strip guide and a second optical strip guide, formed in a body of electrooptic material so as to be synchronously coupled over a coupled length sufficient to provide more than half power coupling but less than full power coupling from one guide to the other, (2) a set of electrodes on the body, for producing an electric field at the strip guides over at least a portion of the coupled length, the set of electrodes consisting of a central electrode, situated between the strip guides and at least one outer electrode, and (3) means for impressing a control voltage on the electrodes of magnitude to produce sufficient asynchronism between the guides to reduce the coupling to half power whereby the directional coupler is caused to become a 3 dB coupler; in which said device the second optically conductive path is longer than the first optically conductive path by an incremental length corresponding to a time delay T, whereby the device functions as a differential phase detector for laser light pulses separated by T.

4. An optical signal processing device comprising two, but not more than two, directional couplers, input means for introducing light into the coupler, introduction of said light resulting in coupled light; processing means for performing signal processing operations on the coupled light, which said processing means includes a first optically conductive path and a second optically conductive path linking the two directional couplers, the processing of said coupled light resulting in processed light; and output means for utilizing the processed light; which said directional couplers each consists essentially of (1) a first optical strip guide and a second optical strip guide, formed in a body of electrooptic material so as to be synchronously coupled over a coupled length sufficient to provide more than half power coupling but less than full power coupling from one guide to the other, (2) a set of electrodes on the body, for producing an electric field at the strip guides over at least a portion of the coupled length, the set of electrodes consisting of a central electrode, situated between the strip guides and at least one outer electrode, and (3) means for impressing a control voltage on the electrodes of magnitude to produce sufficient asynchronism between the guides to reduce the coupling to half power whereby the directional coupler is caused to become a 3 dB coupler; which said first optically conductive path and which said second optically conductive path each includes an optical strip guide, which said optical strip guides each include a frequency selective optical grating whereby a selected frequency of light is reflected in each path and all other frequencies are transmitted, whereby the device functions as a channel dropping filter.

5. A device of claim 4 in which the optical strip guides are formed in an electrooptic material and in which the processing means includes a pair of longitudinally disposed electrodes bracketing each guide in the region of the optical grating whereby the selected frequency can be varied by varying the voltage applied to the electrodes.

6. An optical signal processing device comprising at least one directional coupler; input means for introducing light into the coupler, introduction of said light resulting in coupled light; processing means for performing signal processing operations on the coupled light, the processing of said coupled light resulting in processed light; and output means for utilizing the processed light: which said directional coupler consists essentially of
  (1) a first optical strip guide and a second optical strip guide, formed in a body of electrooptic material so as to be synchronously coupled over a coupled length sufficient to provide more than half power coupling but less than full power coupling from one guide to the other,
  (2) a set of electrodes on the body, for producing an electric field at the strip guides over at least a portion of the coupled length, the set of electrodes consisting of a central electrode, situated between the strip guides and at least one outer electrode, and
  (3) means for impressing a control voltage on the electrodes of magnitude to produce sufficient asynchronism between the guides to reduce the coupling to half power whereby the directional coupler is caused to become a 3 dB coupler.

7. A device of claim 8 in which the first signal path includes a phase modulator.

8. A device of claim 8 including two, but not more than two, directional couplers and in which the processing means includes a first optically conductive path and a second optically conductive path linking the two directional couplers.

9. A device of claim 8 in which the first optically conductive path and the second optically conductive path each includes an optical strip guide.

* * * * *

UNITED STATES PATENT AND TRADEMARK OFFICE
CERTIFICATE OF CORRECTION

PATENT NO. : 4,142,775

DATED : March 6, 1979

INVENTOR(S) : Vellayan Ramaswamy and Robert D. Standley

It is certified that error appears in the above-identified patent and that said Letters Patent are hereby corrected as shown below:

Column 4, line 17, "1." should read --$\ell$.--. Column 4, line 68, "of" should read --or--. Column 5, line 8, after "is" delete comma. Column 5, line 24, "1." should read --$\ell$.--. Column 6, line 19, after "shows" delete comma. Column 6, line 41, "posses" should read --possess--. Column 6, line 58, "modulaters" should read --modulators--.

Signed and Sealed this

Twentieth Day of May 1980

[SEAL]

Attest:

SIDNEY A. DIAMOND

Attesting Officer

Commissioner of Patents and Trademarks